(12) United States Patent
Nielsen et al.

(10) Patent No.: US 7,859,125 B2
(45) Date of Patent: Dec. 28, 2010

(54) METHOD OF CONTROLLING A WIND TURBINE CONNECTED TO AN ELECTRIC UTILITY GRID

(75) Inventors: John Godsk Nielsen, Hornslet (DK); Claus Esbensen, Århus C (DK)

(73) Assignee: Vestas Wind Systems A/S (DK)

( * ) Notice: Subject to any disclaimer, the term of this patent is extended or adjusted under 35 U.S.C. 154(b) by 44 days.

(21) Appl. No.: 11/722,778

(22) PCT Filed: Dec. 28, 2004

(86) PCT No.: PCT/DK2004/000921
§ 371 (c)(1), (2), (4) Date: Nov. 14, 2007

(87) PCT Pub. No.: WO2006/069569
PCT Pub. Date: Jul. 6, 2006

(65) Prior Publication Data
US 2009/0079193 A1  Mar. 26, 2009

(51) Int. Cl.
*H02P 9/10* (2006.01)
(52) U.S. Cl. ........................................ 290/44
(58) Field of Classification Search ................ 290/44
See application file for complete search history.

(56) References Cited

U.S. PATENT DOCUMENTS

| | | | |
|---|---|---|---|
| 4,352,049 A | 9/1982 | Franz, Jr. | |
| 6,812,586 B2* | 11/2004 | Wacknov et al. | 290/52 |
| 6,924,565 B2* | 8/2005 | Wilkins et al. | 290/44 |
| 7,164,562 B2* | 1/2007 | Virtanen | 361/20 |
| 7,330,012 B2* | 2/2008 | Ahmad et al. | 318/811 |
| 7,332,827 B2* | 2/2008 | Nielsen | 290/55 |
| 7,339,287 B2* | 3/2008 | Jepsen et al. | 307/82 |
| 7,447,568 B2* | 11/2008 | Christensen et al. | 700/298 |
| 2003/0151259 A1* | 8/2003 | Feddersen et al. | 290/44 |
| 2005/0116476 A1* | 6/2005 | Feddersen | 290/44 |
| 2005/0237678 A1* | 10/2005 | Virtanen | 361/18 |
| 2006/0017328 A1* | 1/2006 | Bryde | 307/64 |
| 2006/0192390 A1* | 8/2006 | Juanarena Saragueta et al. | 290/44 |
| 2006/0214509 A1* | 9/2006 | Dai et al. | 307/11 |

FOREIGN PATENT DOCUMENTS

| DE | 10105892 A1 | * 9/2002 |
|---|---|---|
| DE | 102 06 828 | 8/2003 |
| JP | 07 194196 | 7/1995 |

OTHER PUBLICATIONS

Computer Translstion of DE 10105892A1 publishedSep. 12, 2002.*
Computer Translation of DE10105892A1 published Dec. 9, 2002.*
International Search Report; PCT/DK2004/000921; Aug. 29, 2005.

* cited by examiner

*Primary Examiner*—Joseph Waks
(74) *Attorney, Agent, or Firm*—St. Onge Steward Johnston & Reens LLC (57) ABSTRACT

Method of controlling a wind turbine connected to an electric utility grid during malfunction in the electric utility grid is provided. The method includes the steps of detecting a malfunction in the electric utility grid and operating at least two control units of a power converter in relation to at least one power converter limit value. A control system for a wind turbine connected to a utility grid and a wind turbine is also provided.

15 Claims, 8 Drawing Sheets

METHOD OF CONTROLLING A WIND TURBINE CONNECTED TO AN ELECTRIC UTILITY GRID

CROSS-REFERENCE TO RELATED APPLICATIONS

The present application is a 371 of PCT/DK04/00921 filed on Dec. 28, 2004.

TECHNICAL FIELD OF THE INVENTION

The invention relates to a method of controlling a wind turbine connected to an electric utility grid during malfunction in said electric utility grid, a control system.

DESCRIPTION OF THE RELATED ART

Typically, wind turbines are connected to an electric utility grid in order to be able to generate and supply electric power to consumers located remotely from the wind turbines. The power is sent through the transmission or distribution lines of the utility grid to the consumers.

Wind turbines and other utility grid connected electric power generating means are generally protected from malfunctions in the utility grid by grid disconnection switches. The switches disconnect the wind turbines from the utility grid at the detection of the malfunction. The malfunction may be defined as grid variations above some specific limit e.g. voltage drops above +/−5% in relation to the nominal value of the grid voltage.

Malfunctions in the utility grid may in some incidences include several, significant voltage drops in a short time period e.g. sags or "brownouts" which are among the most commonly recorded power disturbances in utility grids.

A problem with the grid disconnection of the wind turbines is the fact that the voltage variation may increase in size or duration by the loss of electric power production from the wind turbine generators. Further, the disconnected wind turbines require a period of time before they can be connected to the utility grid again. The disconnection of the wind turbines affects the production of power from the wind turbines and thus their profitability.

The prior art has suggested different solutions in order for a wind turbine to ride through one short grid malfunction. However, a modern variable speed wind turbine may sustain damaged when the voltage of the utility grid suddenly disappears and it is not disconnected from the grid. Damage may sustained by a rapid raising voltage at the rotor side of the wind turbine generator or in the frequency converter. Further damage may be inflicted on the wind turbine when the grid voltage returns due to the flow of large currents and especially to the frequency converter.

The prior art disclosed in German patent application no. DE-A 102 06 828 suggests the use of a resistor and power transistor in the DC link between a rectifier and inverter circuit and connected in a parallel relation with the capacitor of the DC link. The resistor may be switched in and out in order to discharge the capacitor and thus remove a short voltage spike.

BRIEF SUMMARY OF THE INVENTION

The invention establishes a technique for controlling a wind turbine during severe malfunctions in an electric utility grid and without the above-mentioned disadvantage.

The invention further creates a technique that is flexible and thus may protect the wind turbine during the utility grid malfunction as well as immediately after the removal of the malfunction regardless of the nature of the failure.

The invention relates to a method of controlling a wind turbine connected to an electric utility grid during malfunction in said electric utility grid, said method comprising the steps of and operating at least two control units of said power converter in relation to at least one power converter limit value.

Hereby, is a method established which does not include the above-mentioned disadvantages. It is advantageous that the method allows a more flexible control of the protection means during grid failures where a vast number of different approaches may be chosen in dealing with the grid failure and the exact consequences hereof.

Especially, it is possible to diminish the dV/dt value and thus avoid any voltage or current spikes that may e.g. damage the switches of the power converter.

In an aspect of the invention, said at least two control units are operated in relation to a minimum or a maximum limit voltage value of the DC link in said power converter in order to keep the voltage value of the DC link in between said minimum and maximum limit voltage values. Hereby, it is possible to add or subtract control units in relation to a voltage, a temperature value or further work values representing the converter in order to meet and suppress the consequences of the malfunction.

In an aspect of the invention, said control units include the generator and grid side circuits of the power converter which are operated to disconnect said power converter from the electric generator and the electric utility grid at the reach of said minimum or maximum limit value of the DC link. Hereby, it is possible to protect the power converter if the grid failure is too severe to ride through without disconnection from the utility grid. Further, it is possible to preserve some minimum values such as DC link voltage and converter frequency values that will become initial work values of the power converter at the return of the utility grid to normal functionality.

In an aspect of the invention, said control units further comprise one or more resistor blocks which connects at least one resistor between the busbars of the DC link in said power converter. Hereby, it is possible to direct power from the capacitor of the DC-link to a ground plane through the resistor and thus reduce the DC link voltage.

In an aspect of the invention, said at least one resistor is switchable connected to the busbars. Hereby, it is possible to reduce the strain that the block meets in relation to a continuous operation of the block.

In an aspect of the invention, each of said resistor blocks is switched with a frequency depending on the voltage value of the DC link. Hereby, it is possible to optimize the power reduction in relation to resistor block and the switches of the power converter.

In an aspect of the invention, said resistor blocks are successively becoming active as the voltage value of the DC link moves up. Hereby it is possible to adapt the blocks to the relevant values of the failure situation.

In an aspect of the invention, each of said resistor blocks is active in limited time periods. Hereby, it is possible to ensure that the blocks are not operated in too long periods resulting in damage to the control system.

In an aspect of the invention, each of said resistor blocks is operated and becoming active in relation to their block temperature. Hereby, it is possible to control the blocks more precisely and thus extend the active periods of the blocks.

The invention also relates to a control system wherein said system further comprises at least two control units of said power converter controlled in relation to at least one power converter limit value during said malfunction. Hereby, is established an advantageous control system.

In an aspect of the invention, said at least two units comprise a plurality of resistor blocks wherein each block includes at least one resistor and switch. Hereby, it is possible to control the blocks individually and optimize the power reduction.

In an aspect of the invention, said resistor blocks further include temperature measuring means.

In an aspect of the invention, said at least two units also include the generator and grid side circuits of the power converter mutually connected by the DC link of the power converter.

In an aspect of the invention, said system includes means for measuring the DC link voltage value and means for comparing said value with limit values such as the minimum or a maximum limit voltage value of the DC link in said power converter The invention also relates to wind turbine comprising at least two units of said power converter controlled in relation to at least one power converter limit value.

In an aspect of the invention, said at least two units of said power converter are positioned in a distance from each other e.g. in different positions of the nacelle. Hereby it is possible to level out the heat influence from the different units as well as minimize the size of any necessary cooling means for each unit.

BRIEF DESCRIPTION OF THE FIGURES

The invention will be described in the following with reference to the figures in which.

DETAILED DESCRIPTION

Figure 1:
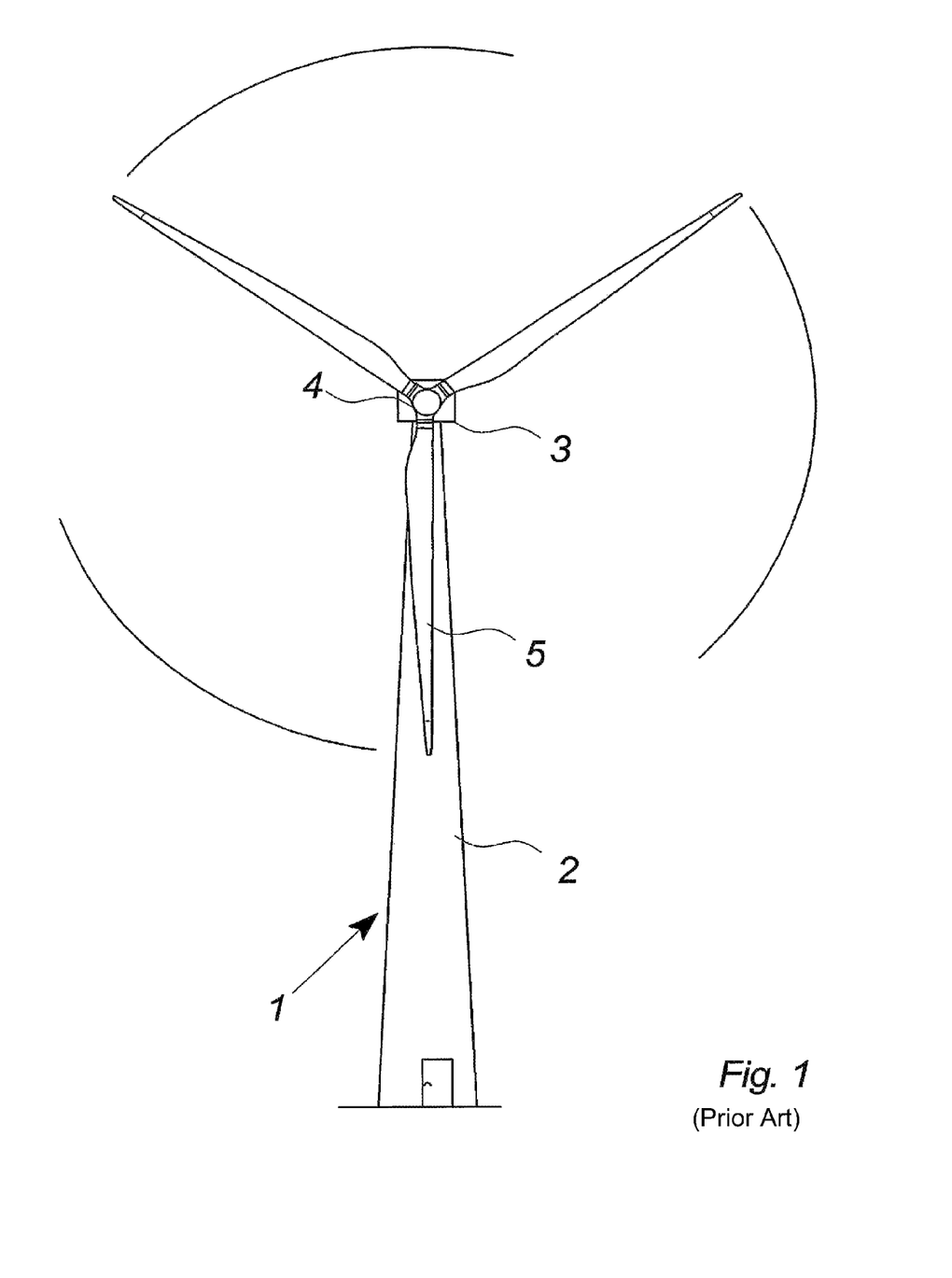
FIG. 1 illustrates a large modern wind turbine.

FIG. 1 illustrates a modern wind turbine 1 with a tower 2 and a wind turbine nacelle 3 positioned on top of the tower. The wind turbine rotor 5, comprising three wind turbine blades, is connected to the nacelle through the low speed shaft that extends out of the nacelle front.

As illustrated in the figure, wind beyond a certain level will activate the wind turbine rotor due to the lift induced on the blades and allow it to rotate in a perpendicular direction to the wind. The rotation movement is converted to electric power, which is supplied to the utility grid.

Figure 2:
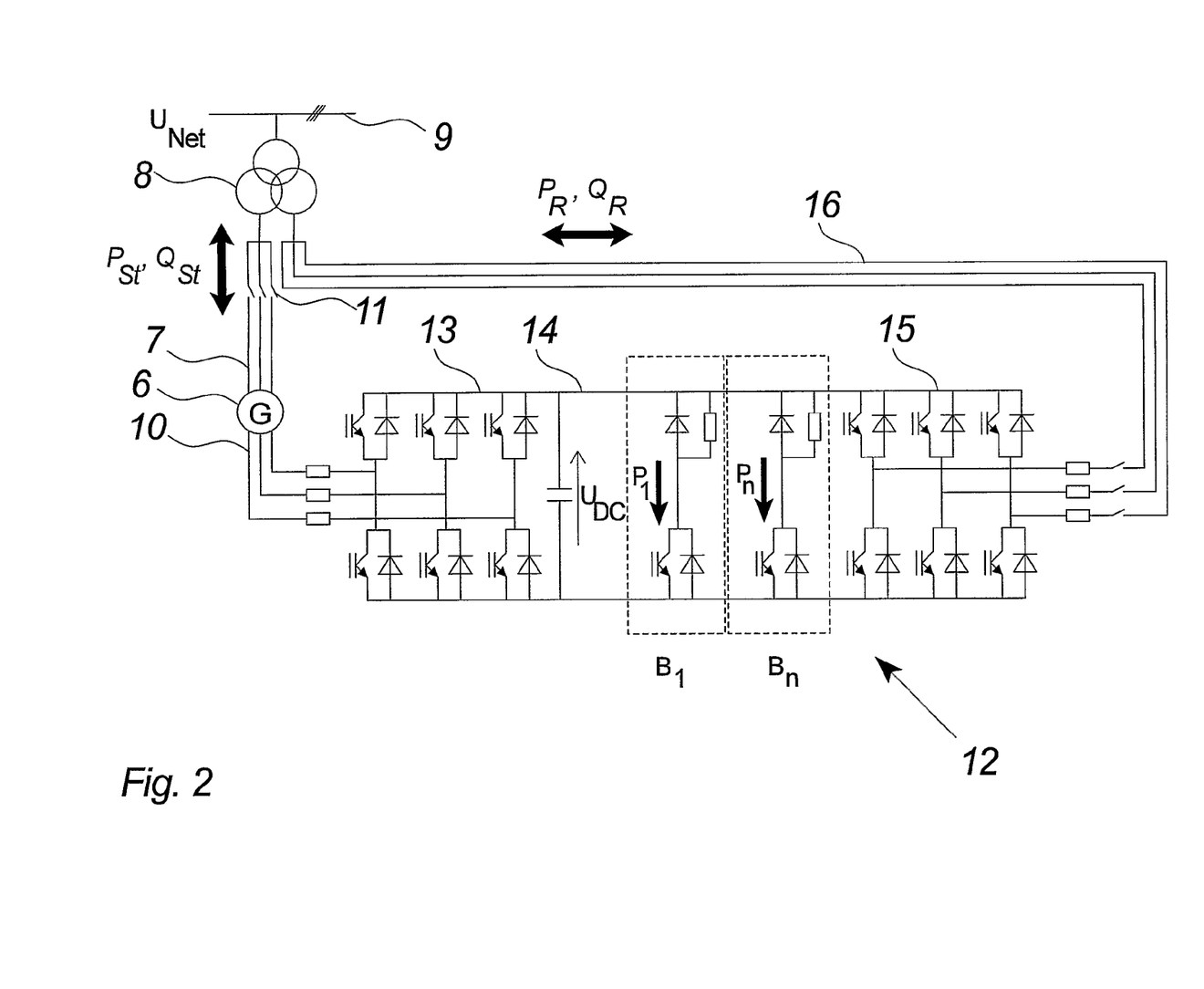
FIG. 2 illustrates an embodiment according to the invention of a wind turbine generator with a frequency converter connected to a utility grid.

FIG. 2 illustrates a preferred embodiment of a variable speed wind turbine comprising a doubly fed electric induction generator 6 and a frequency and power converter 12 connected to the rotor of the generator.

The electric generator 6 comprises a stator 7, connected to the utility grid through disconnection switches 11 and the three phased transformer 8, and may directly supply power, $P_{St}$ (active stator power) and $Q_{St}$ (reactive stator power) to the utility grid or receive power from the utility grid.

The rotor of the generator is mechanically driven by the wind turbine rotor (5 as illustrated in FIG. 1) through the low speed shaft, the gearing means and the high speed shaft (not illustrated in the figures). Further, the rotor is electrically connected to the frequency converter 12. The frequency converter 12 may convert a variable AC voltage to an intermediate DC voltage and subsequently to a fixed AC voltage with a fixed frequency.

The frequency converter 12 includes a rotor side converter circuit 13 to rectify the AC voltage of the generator 6 to a DC voltage at the DC link 14 or to invert the DC voltage to an AC voltage to be supplied to the rotor of the generator. The DC link smoothen the DC voltage over a DC link capacitor C. The grid side converter circuit 15 inverts the DC voltage to an AC voltage with a preferred frequency or vice versa. The rotor power, $P_r$ (active rotor power) and $Q_r$ (reactive rotor power), with the resulting AC voltage and the preferred frequency is transferred to (or from) the utility grid through the transformer 8.

The wind turbine may be controlled to supply electric power from the generator to the utility grid with a constant voltage and frequency regardless of changing wind and wind turbine rotor speeds.

The DC link further comprises at least two over-voltage control units $B_1$, $B_n$, resistor blocks, connected between the two bus bars of the DC link. Each control unit is connected in parallel with the DC link capacitor C and comprises at least a resistor R and a controllable power switch SP in a serial connection. The present embodiment of the control unit also comprises an anti-parallel diode for the resistor and the power switch. The power switch may be turned on and off in order to direct a current through the resistor and hereby dissipating power $P_1$, $P_n$ in the resistor. The DC link voltage $U_{DC}$ may be lowered as charges are removed from the DC link capacitor by directing current through the resistor of the control unit. Consequently, power generated by the electric generator may be dissipated as power $P_1$, $P_n$ in the over-voltage control units in time periods where it not possible to direct some or all the power $P_R$ to the utility grid.

The disconnection switches 11 of the stator and the rotor allows the electric generator to be disconnected from the utility grid e.g. in connection with maintenance work on the wind turbine or an islanding situation in the utility grid. Further, the wind turbine may be disconnected the utility grid if a grid failure involving a significant voltage drop persists over a longer time period.

Figure 3:
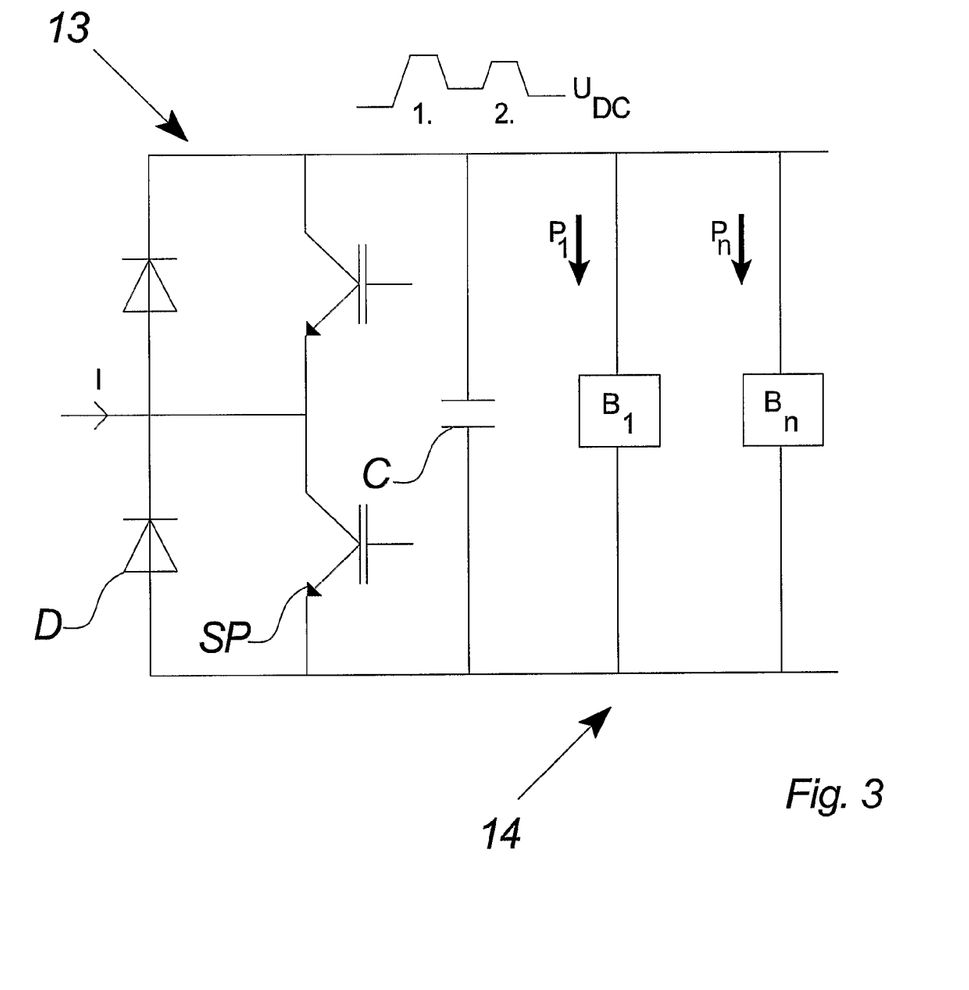
FIG. 3 illustrates a section of the frequency converter.

FIG. 3 illustrates a section of the frequency converter including a branch of the rotor side converter circuit and the DC link. The branch is a phase of the three-phase Pulse Width Modulation (PWM) frequency converter and includes two power switches SP such as Insulated Gate Bipolar Transistor (IGBT's) with anti-parallel diodes.

The DC link capacitor C and the at least two over-voltage control units $B_1$, $B_n$ are connected to the positive and negative busbars of the DC link.

Further, the figure illustrates schematically how power may be dissipated in the resistors of the at least two over-voltage control units $B_1$, $B_n$ and hereby lower the DC link voltage. The switches of the units are controlled in such a way that power may be dissipated in the resistors simultaneously or in different time periods in relation to the over-voltage value and/or the temperature of the frequency converter including the units as will be explained further below.

Figure 4A:
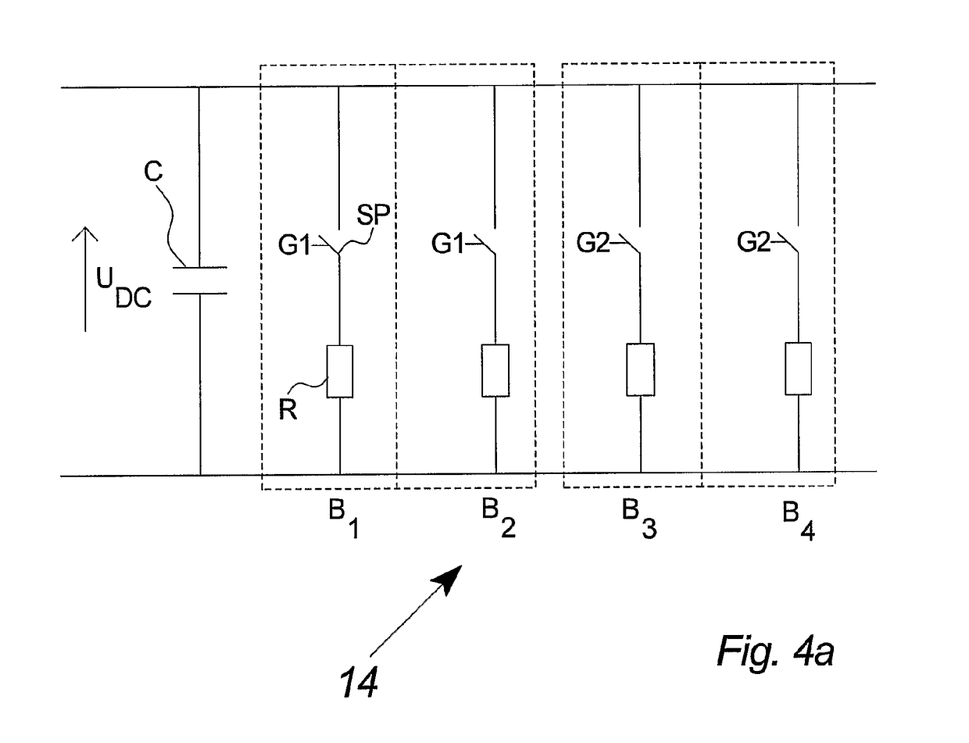
FIGS. 4a and 4b illustrate schematically over-voltage control units and examples of gate driver control signals for the units.
Figure 4B:
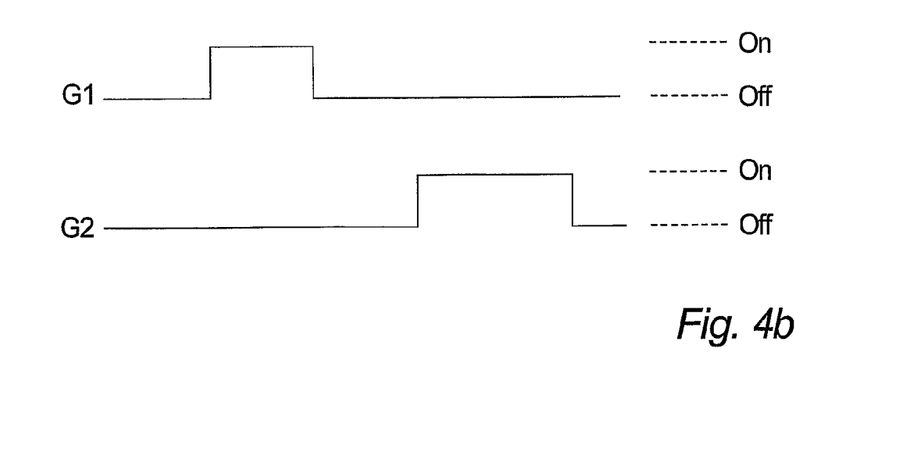

FIGS. 4a and 4b illustrate schematically the over-voltage control units with an example of gate driver control signals G1, G2 controlling the units.

FIG. 4a illustrates an embodiment of the invention involving four over-voltage control units $B_1$-$B_4$ connected to the busbar system of the DC link 14 and in parallel with the DC link capacitor C.

Each of the control units is schematically illustrated as comprising a resistor R and a switch SP controlled by a gate driver control signal G1 or G2. The first control signal G1 is used to control the first two control units $B_1$, $B_2$ i.e. the same amount of power is dissipated in different located units e.g. inside the nacelle or the tower of the wind turbine. The second control signal G2 is used to control the last two control units $B_3$, $B_4$ i.e. the same amount of power is dissipated in different located units.

FIG. 4b illustrates an example of gate driver control signals G1, G2 controlling the units. The figure illustrates a first signal G1 changing from a low off value to a high on value in a time period whereby the over-voltage control units $B_1$ and $B_2$ will dissipate power. Subsequently, the second signal G2 changes from a low off value to a high on value in a time period whereby the over-voltage control units $B_3$ and $B_4$ will dissipate power.

The example illustrates that the over-voltage control units are controlled in order to dissipate power in different periods where the periods are of different duration i.e. dissipating different amount of power in the control units.

However, a number of control strategies may be chosen for the individual control units e.g. using resistors of the same or different value and controlling with the same or different time period. By the choices in resistor values and time periods it is possible to divide the amount of power which a control unit faces e.g. the same amount of power for each unit or different amounts of power.

Figure 5:
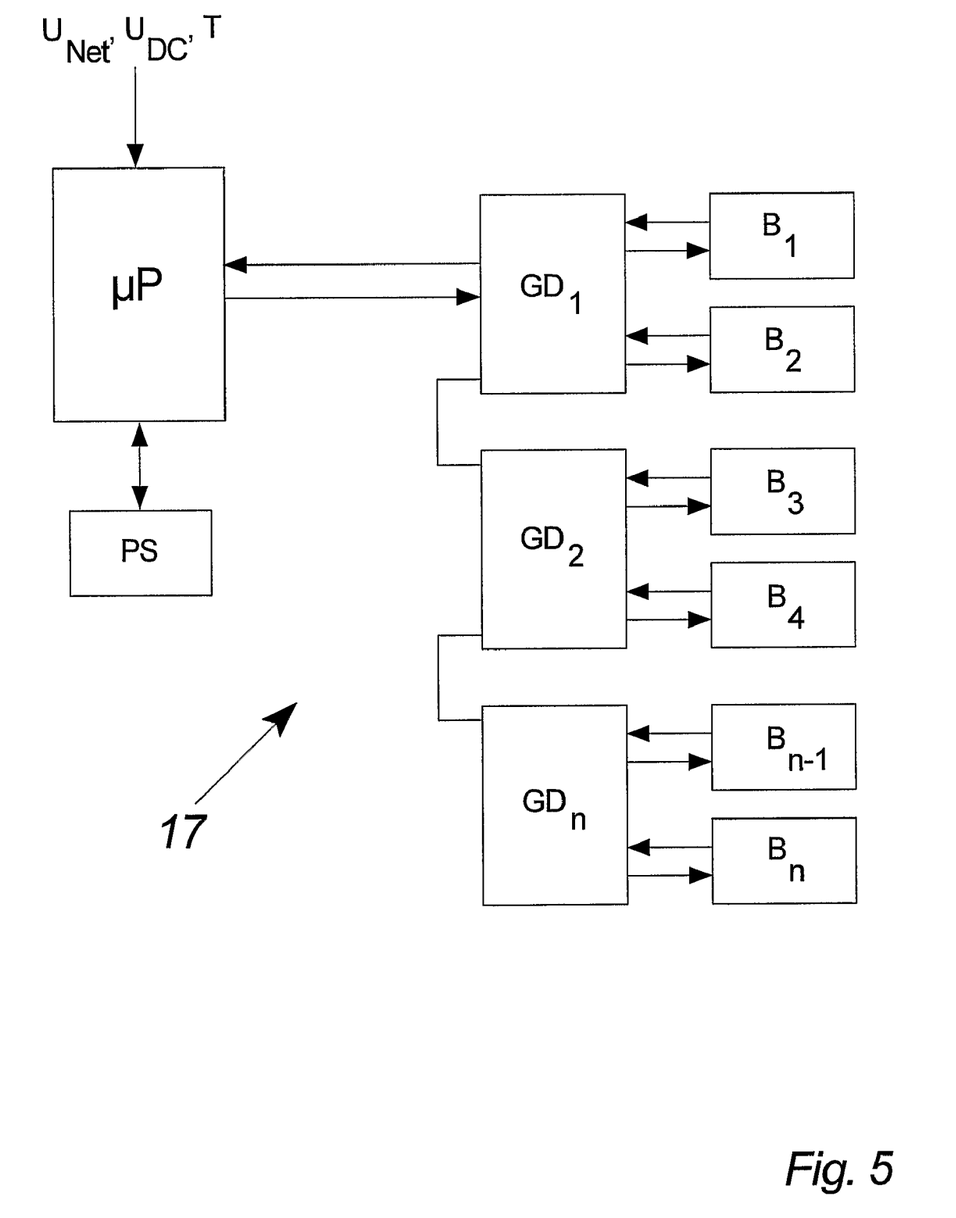
FIG. 5 illustrates a control system for the over-voltage control units.

FIG. 5 illustrates an embodiment of a control system for the over-voltage control units according to the invention.

The system includes a number of input values for a microprocessor μP from measuring means such as the measured voltage value of the electric utility grid $U_{Net}$, the DC link voltage value $U_{DC}$ of the frequency converter 12 and the temperature of the control units $B_1$-$B_n$.

The microprocessor further comprises connection to parameter and data storage PS wherein the storage may hold limit and threshold values such as the maximum and minimum DC link voltage values and temperature values.

The maximum value defines the dangerous and potentially damaging over-voltage for the switches of the frequency converter. The minimum value defines the under-voltage which results in a dangerous and potentially damaging current will flow through the switches of the frequency converter.

The temperature limit values define the temperature values wherein the control units or frequency converter as such may sustain damage. The limit values may also include time values such as the longest time period that a control unit may be active and facing power. Further, threshold voltage or temperature values may be stored in the storage where the values define a situation that should initialize an action such as activating more control units.

Other values may be stored in the storage such as over-current values that indicate a shorter termination of control signals for the switches of the frequency converter e.g. to limit the rotor current of a doubly fed induction generator of a wind turbine.

The microprocessor controls a number of control units $B_1$-$B_n$ through gate drivers $GD_1$-$GD_n$ in relation to the measured and stored values. The figure illustrates that each gate driver controls two control units and usually with the same gate driver control signal to the switches of the control units. However, it should be understood that each control unit may be controlled individually by the microprocessor and a gate driver or more than two units may be controlled by just one gate driver.

A preferred embodiment of the control system may involve two or four control units but other numbers may be chosen if advantageous in the given application e.g. more units in very high power frequency converters.

Figure 6:
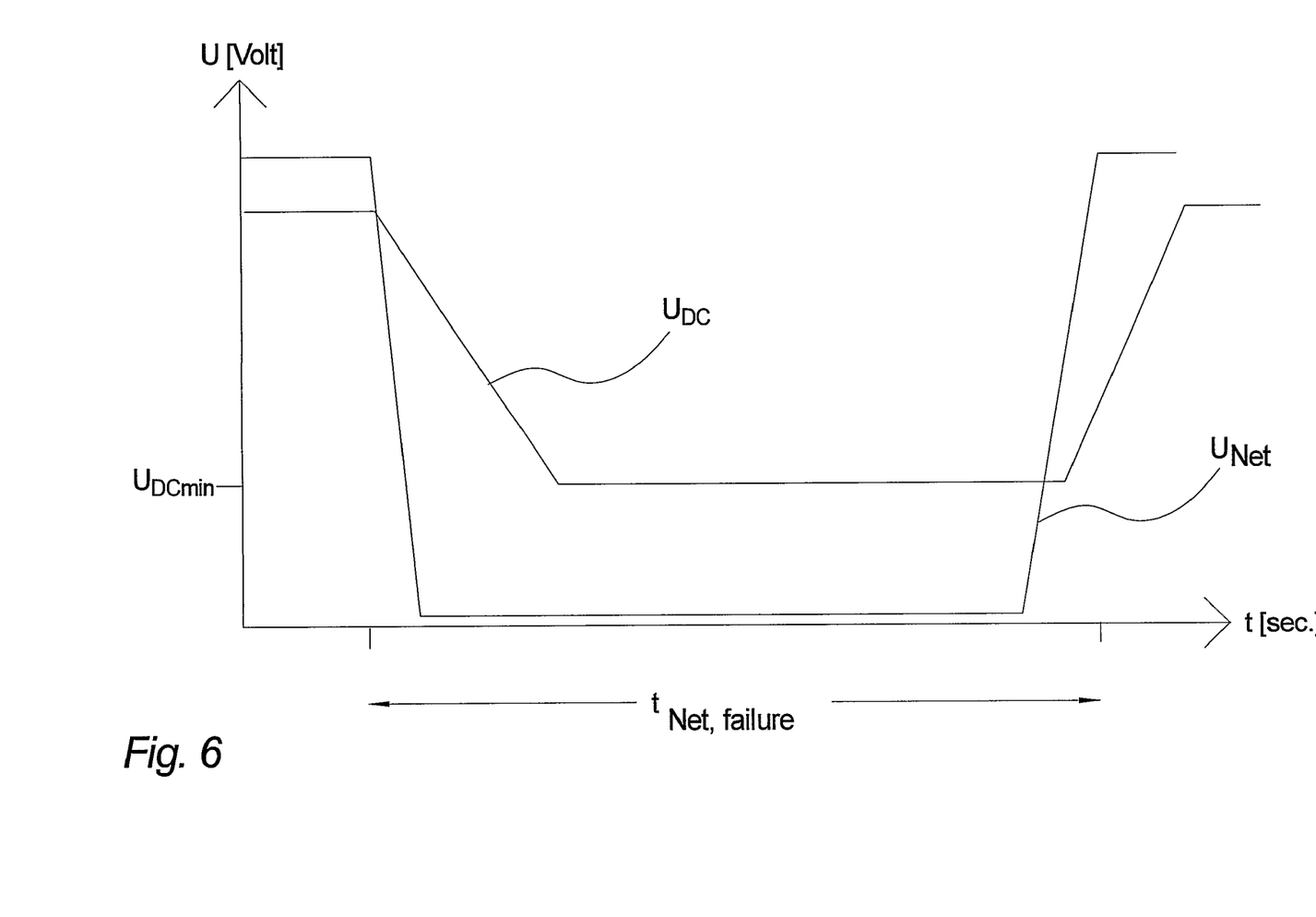
FIG. 6 illustrates a curve for the utility grid voltage and a corresponding curve for the intermediate DC voltage at an utility grid failure.

FIG. 6 illustrates an example of a curve for the utility grid voltage $U_{Net}$ and a corresponding curve for the intermediate DC link voltage $U_{DC}$ at a utility grid failure.

The utility grid voltage is schematically illustrated in the example as a curve dropping rapidly from a nominal value to a value very close to zero voltage in the time period of the grid failure.

The corresponding curve for the DC link voltage comprises a slope due to the energy storage of the DC link capacitor. However the value is also dropping and eventually reaches a value $U_{DCmin}$ where the switches of the rotor and grid side converter circuits are deactivated and thus separate the frequency converter from the electric generator and the utility grid. Further, the control units connected between the busbars of the DC link is deactivated and consequently, the discharging of the DC link capacitor is stopped. The voltage $U_{DC}$ hereby remains at the value $U_{DCmin}$ until the utility grid failure is removed and the utility grid voltage has resumed its nominal value where the voltage $U_{DC}$ also will return to its normal value.

The initial current values are hereby restricted as the voltage $U_{DC}$ remained at the value $U_{DCmin}$ until the grid voltage returned.

Figure 7:
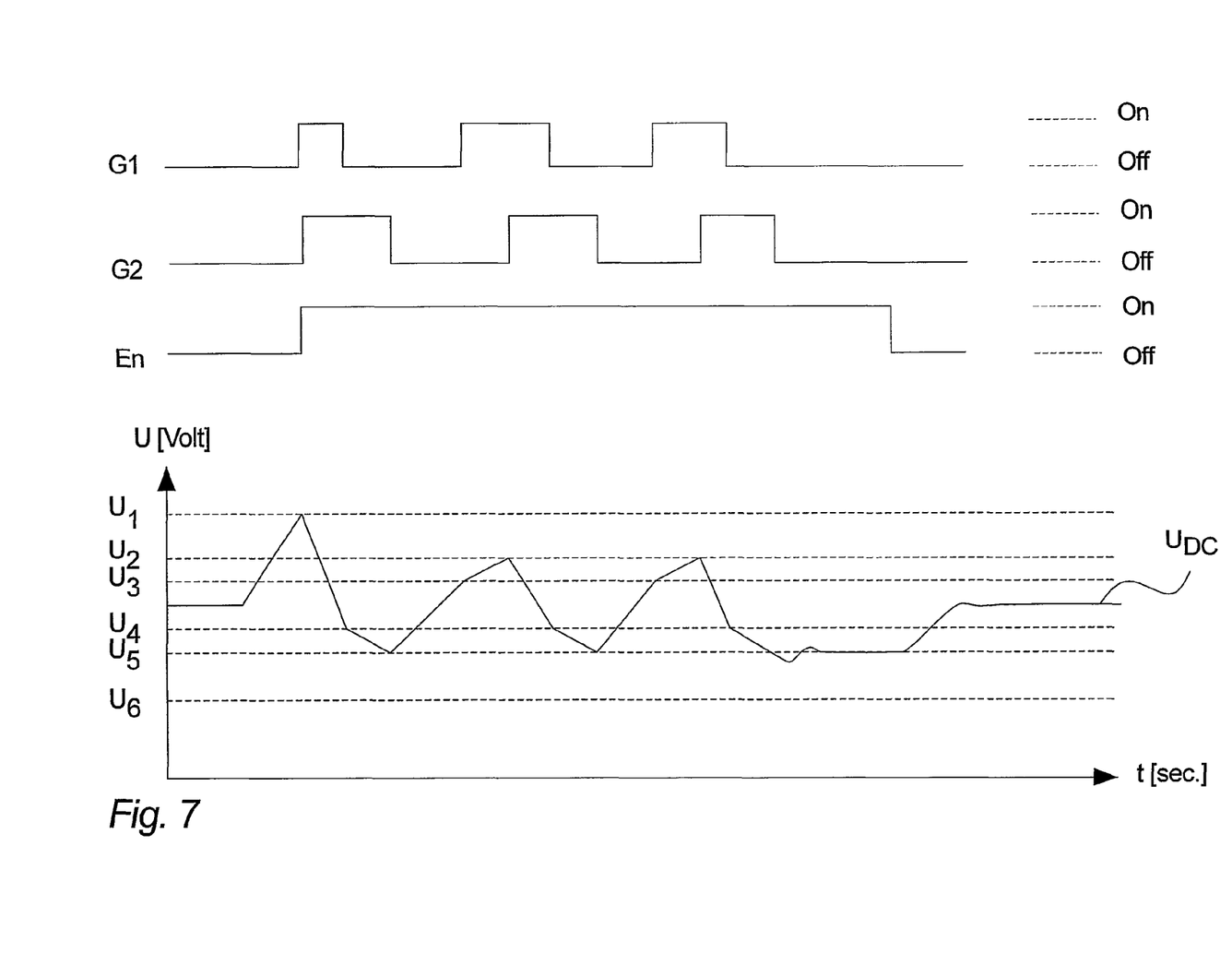
FIG. 7 illustrates the gate driver control signals for the over-voltage units and the corresponding curve for the intermediate DC voltage.

FIG. 7 further illustrates the gate driver control signals $G_1$, $G_2$ for a number of over-voltage control units in the control system and the corresponding curve for the intermediate DC voltage $U_{DC}$ during the grid failure.

The figure initially illustrates how the grid failure results in an over-voltage raising to a value of $U_1$ (a value close to $U_{max}$). In order to protect the frequency converter and the wind turbine both gate driver control signals go to a high value and thus activates the corresponding control units. After a time period the voltage has dropped to a lower value $U_4$ and one control signal go to a low value; deactivating the corresponding control unit, and subsequently the other control signal go to a low value; deactivating the last control unit as the voltage keeps dropping. By deactivating all control units the voltage raises again and the control system may once again activated one or more of the control units in order to control the voltage until the grid failure has disappeared.

Figure 8:
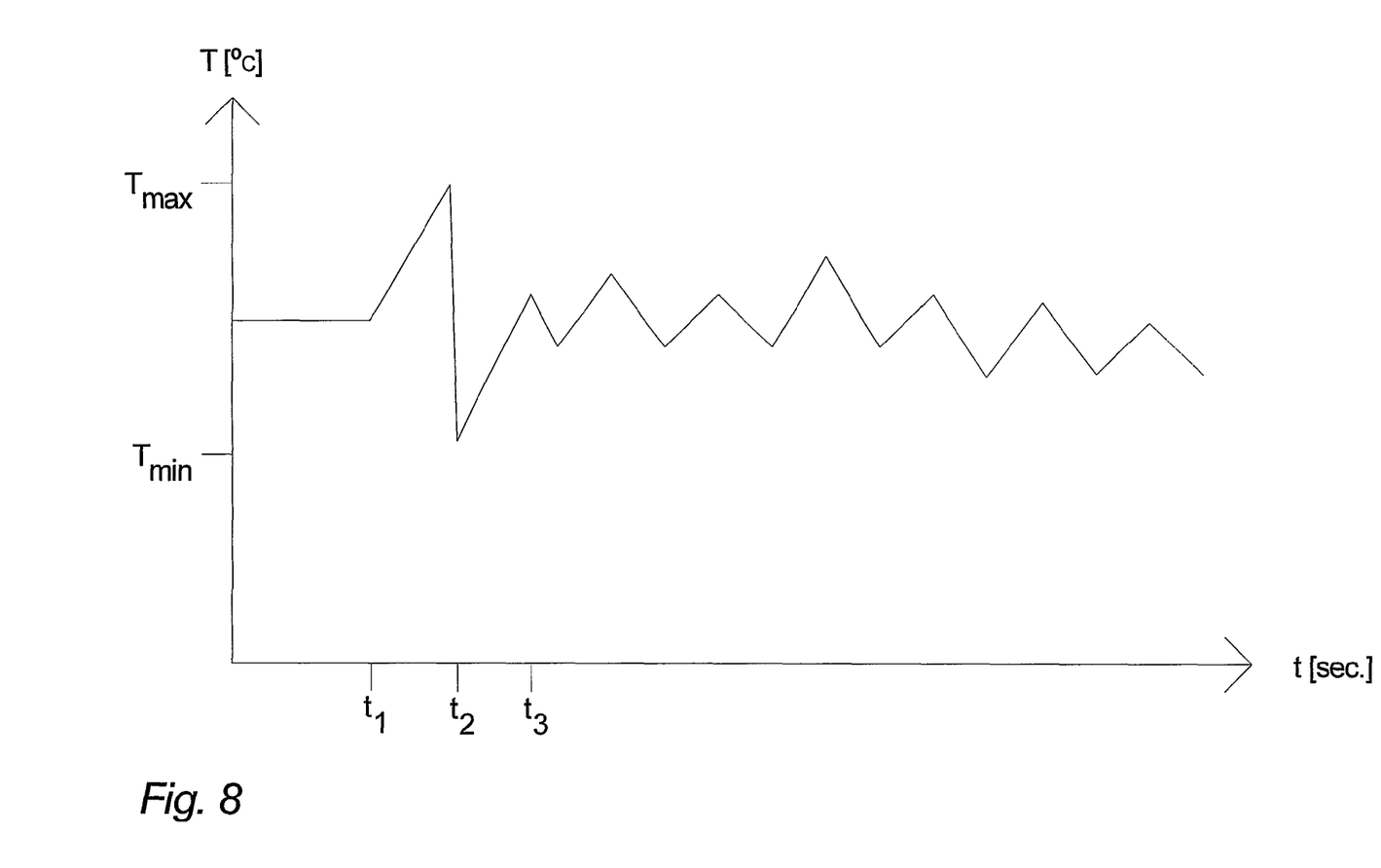
FIG. 8 illustrates a temperature curve of the wind turbine during a utility grid failure.

FIG. 8 illustrates a temperature curve of the control units of the wind turbine during a utility grid failure where the failure starts at time $t_1$. The one or more control units are activated at the time and face an amount of power due to their limiting of an over-voltage in the DC link of the frequency converter. Consequently, the temperature curve raises and at the time $t_2$ temperature limit $T_{max}$ value is reached for the active control units. The microprocessor activates further control units and the temperature drops to a temperature limit $T_{min}$ value at a time $t_3$ and as a consequent at least one unit is deactivated.

This control of the number of active control units continue until the grid failure has disappeared.

The invention has been exemplified above with reference to specific examples.

However, it should be understood that the invention is not limited to the particular examples described above but may be used in connection with a wide variety of applications e.g. a number of wind turbines connected to the same frequency converter. Further applications may involve an induction or a synchronous generator of a wind turbine connected to a full scale frequency converter.

Even further, it should be understood that especially the frequency converter may be designed in a multitude of varieties e.g. as a thyristor based rectifier and inverter system.

Further, it should be understood that the invention may use a wide variety of measured value if they directly or indirectly correspond to the above mentioned voltage and temperature values e.g. current values instead of voltage values. The position of the measurements in the wind turbine system may also be changed if the measurements correspond to the above suggested in development at least over the time of the grid failure.

The invention claimed is:

1. Method of controlling a wind turbine, including an electric generator and a power converter, connected to an electric utility grid during a malfunction in said grid, said method comprising detecting the malfunction in said electric utility grid, and operating at least two control units of said power converter in relation to at least one power converter limit value and at least one further value;

wherein said at least two units comprise a plurality of resistor blocks wherein each block includes at least one resistor and switch.

2. Method of controlling a wind turbine according to claim 1 where said at least two control units are operated in relation to a minimum or a maximum limit voltage value of a DC link in said power converter in order to keep the voltage value of the DC link in between said minimum and maximum limit voltage values.

3. Method of controlling a wind turbine according to claim 2 where said control units include generator and grid side circuits of the power converter which are operated to disconnect said power converter from the electric generator and the electric utility grid at the reach of said minimum or maximum limit value of the DC link.

4. Method of controlling a wind turbine according to claim 2 where said control units further comprise one or more resistor blocks which connects at least one resistor between busbars of the DC link in said power converter.

5. Method of controlling a wind turbine according to claim 4 where said at least one resistor is switchable connected to the busbars.

6. Method of controlling a wind turbine according to claim 4 where each of said resistor blocks is switched with a frequency depending on the voltage value of the DC link.

7. Method of controlling a wind turbine according to claim 4 where said resistor blocks are successively becoming active as the voltage value of the DC link moves up.

8. Method of controlling a wind turbine according to claim 1 where each of said resistor blocks is active in limited time periods.

9. Method of controlling a wind turbine according to claim 1 where each of said resistor blocks is operated and becoming active in relation to a block temperature.

10. Control system for controlling a wind turbine connected to an electric utility grid during a malfunction in said grid, said system comprising means for detecting the malfunction in said electric utility grid, a power converter, and at least two control units of said power converter controlled in relation to at least one power converter limit value during said malfunction and at least one further value, wherein said at least two units comprise a plurality of resistor blocks wherein each block includes at least one resistor and switch.

11. Control system according to claim 10 wherein said resistor blocks further include temperature measuring means.

12. Control system according to claim 10 wherein said at least two units also include generator and grid side circuits of the power converter mutually connected by a DC link of the power converter.

13. Control system according to claim 12 wherein said system includes means for measuring the DC link voltage value and means for comparing said value with limit values.

14. Wind turbine connected to a utility grid comprising an electric generators a power converters connected to said electric generator and utility grid, and a control system according to claim 10.

15. Wind turbine according to claim 14 wherein said at least two units of said power converter are positioned in a distance from each other.

* * * * *